C. W. TAYLOR.
POWER TRANSMISSION MECHANISM.
APPLICATION FILED JULY 25, 1911.
1,025,332.
Patented May 7, 1912.
2 SHEETS—SHEET 1.
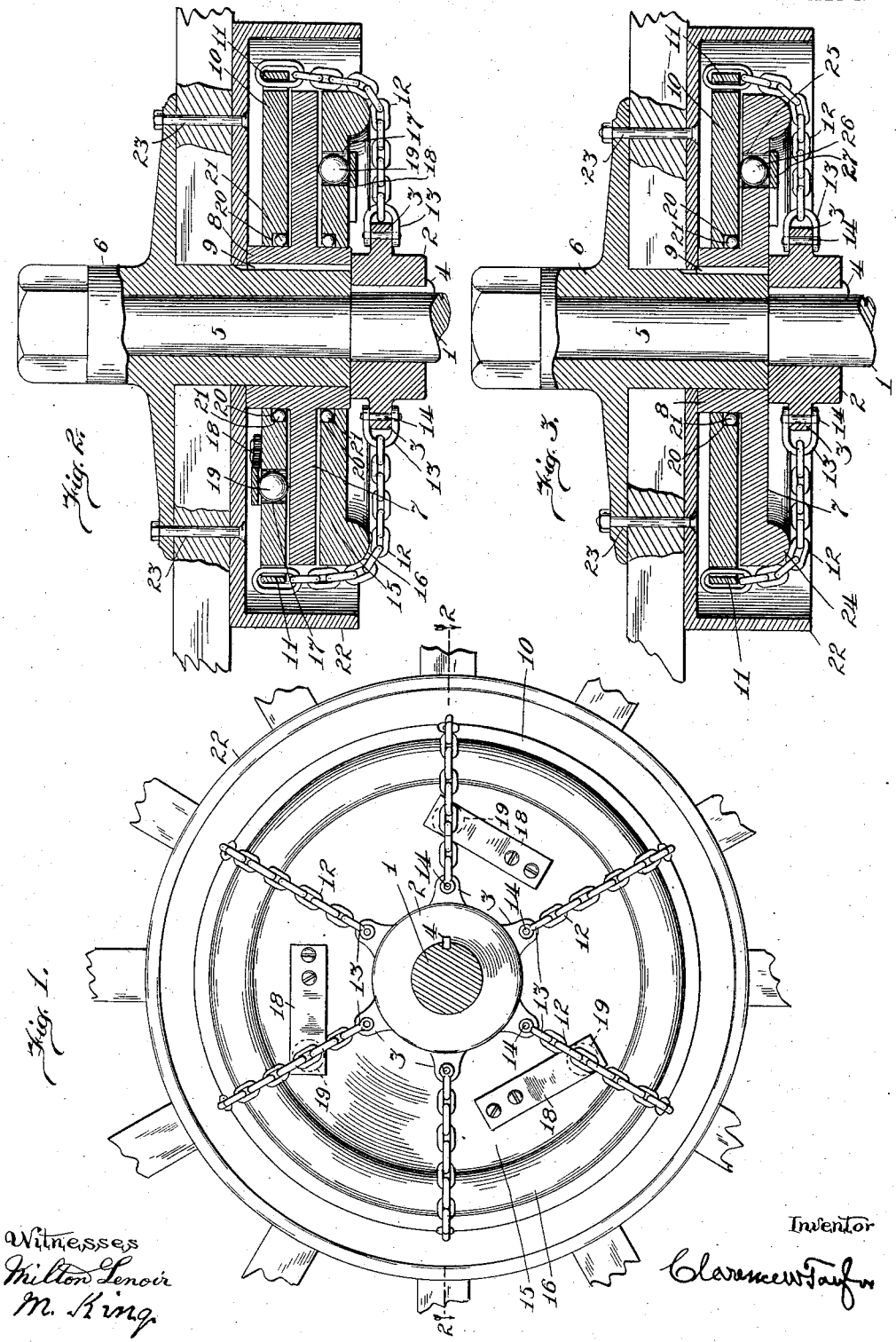

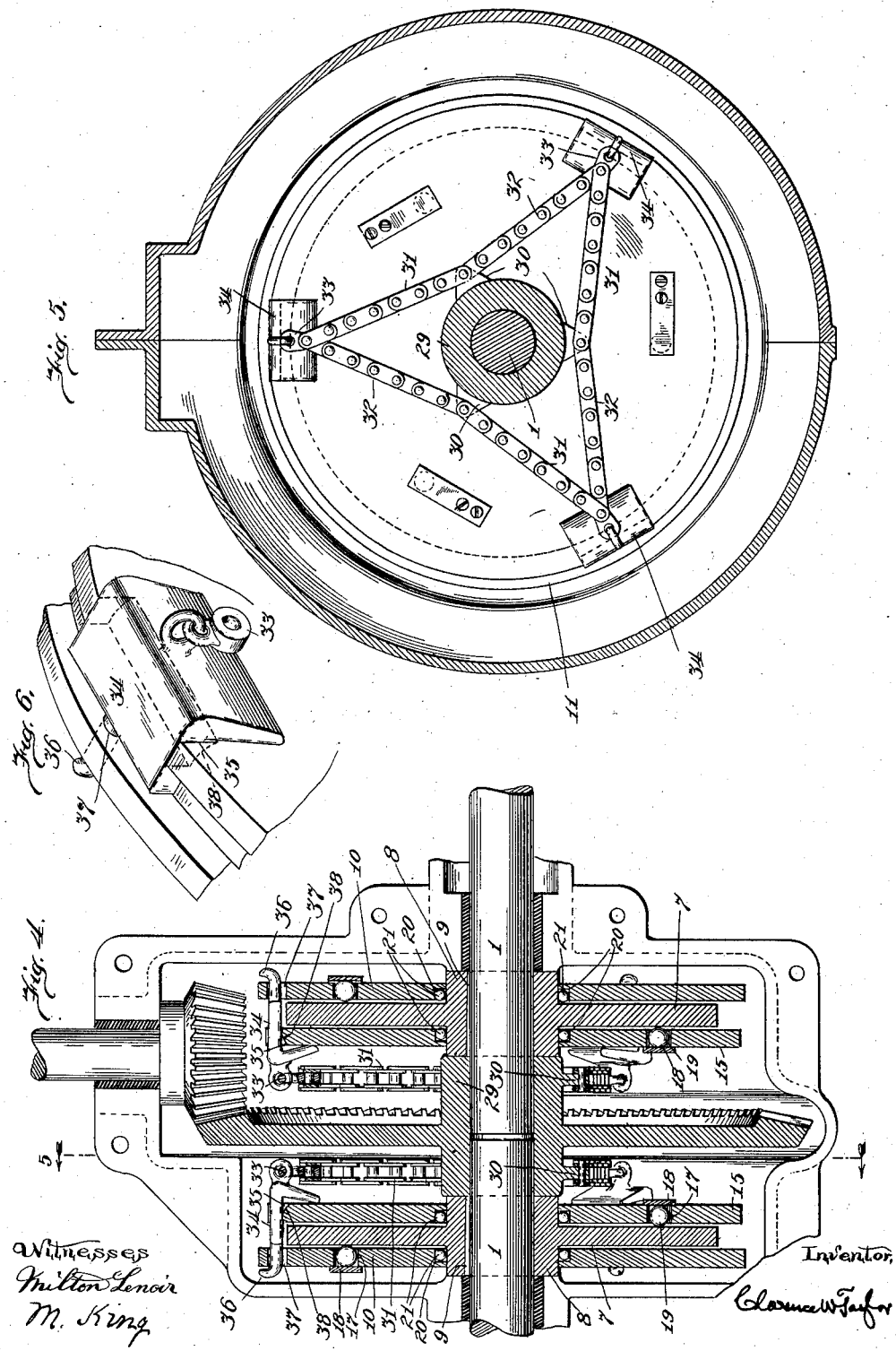

UNITED STATES PATENT OFFICE.

CLARENCE W. TAYLOR, OF CHICAGO, ILLINOIS.

POWER-TRANSMISSION MECHANISM.

1,025,332. Specification of Letters Patent. Patented May 7, 1912.

Application filed July 25, 1911. Serial No. 640,514.

*To all whom it may concern:*

Be it known that I, CLARENCE W. TAYLOR, a citizen of the United States, residing at Chicago, in the county of Cook and State of Illinois, have invented certain new and useful Improvements in Power-Transmission Mechanism, of which the following is a specification.

My invention relates to improvements in power transmission mechanism, and the objects of my improvement are first, to provide a simple, efficient and durable mechanism of the class; second, to afford comparatively large and variable engaging surfaces of the member to which power is transmitted; third, to facilitate quick disengagement of the driven from the driving parts; and, fourth, to substitute ball or roller friction for that of sliding contact of the driven member excepting at the instant of frictional adherence.

With the above and other objects in view, my invention consists in the novel features and in the novel combination and arrangement of parts hereinafter fully described, illustrated in the accompanying drawings forming a part of the specification, and particularly pointed out in the claims hereunto appended, it being understood that changes, variations and modifications in the details of the invention within the scope of the claims, may be resorted to without departing from the spirit or sacrificing any of the advantages thereof.

Figure 1 is an end elevation of my invention applied to a wheel of an automobile. Fig. 2 is a section on line 2—2 of Fig. 1. Fig. 3 is a vertical section of a modified form. Fig. 4 is a horizontal section of a modification applied to the adjacent ends of a rear axle or shaft of an automobile. Fig. 5 is a section on line 5—5 of Fig. 4. Fig. 6 is a detail perspective of a modified form of pinching device.

Similar reference numerals refer to similar parts throughout the several views.

The reference numeral 1 designates a shaft or axle having a collar 2, with lugs 3 keyed to the axle at 4. On the reduced portion 5 of the axle there is loosely mounted a vehicle wheel, having a hub portion 6. The wheel carries a driven member 7 with a hub 8 keyed at 9 to the inwardly projecting portion of the wheel hub. Preferably the driven member consists of a disk of suitable diameter to give a considerable engaging surface. When required both surfaces of the driven disk may be employed for power transmitting purposes. In cars in which a small amount of power is used only one surface of the driven member need be provided with an idle disk.

From the view point of some engineers, it is not desirable to equip a car with two mechanisms which are not positive drives. Therefore, for the purpose of approximating a positive drive in cases requiring the application of great power, I have provided two disks adapted to be forced into contact with the driven member, as hereinafter described.

The reference numeral 10 denotes an outer idle friction disk having apertures 11 for engagement of draw-connectors or chains 12, each of which is secured at its inner end by a clevis 13 and pin 14 to lug 3.

The inner idle friction disk 15 preferably is provided with an external annular rib 16 which gives added strength. The inward movement of the chain or chains urges the ribbed disk against the adjacent surface of the driven disk 7.

Anti-friction rolls or balls are employed. These are disposed in holes 17 through the respective disks. Elastic blades 18 are fixed at one end to the disks and the other ends are free to yieldably bear against the balls 19 positioned in the openings 17. These balls are of greater diameter than the thickness of each disk. In the hub bearing edges of the disks 10 and 15 respectively are recesses 20 provided with steel balls 21 to lessen friction of the idle disks with the hub of the driven member 7.

22 denotes an ordinary brake flange on the wheel secured thereto by bolts 23.

In Fig. 3 is shown a modification in which only one idle disk is employed to lessen cost of manufacture and to meet cases not requiring greater power of transmission.

The external annular rib 24 is formed on one surface of the driven member 7. The holes 25 for the steel balls 26 and the elastic blades 27 are carried by the member 7, instead of the idle disk. Therefore, the disk 28 is imperforate.

A further modification is shown in Fig. 4 in which the invention is applied to the adjacent ends of a divided shaft on which the hub 29 of a bevel gear wheel is loosely mounted for rotation to actuate the chains in either direction. The lugs 30 are attached to or integral with the hub 29. The chains preferably are in pairs, those marked 31 pull when the hub 29 rotates to the right, and those indicated by the reference numeral 32 are in commission when the hub 29 rotates to the left or in the opposite direction.

33 designates a suitable connecting link attached to the pinching member 34 which is positioned in the notch 35 in the disk 15. The rearwardly projecting hook 36 is in engagement with the disk 10 through aperture 37. The disk is beveled or rounded at 38 for downward movement of the member 34. Normally the disks 10 and 15 are out of surface contact with the driven member 7 and the anti-friction balls only are in contact with member 7.

In operation when the shaft or axle 1 is rotated in either direction the chains draw the disk 10 against one surface and force the disk 15 against the other surface of the driven member 7 in a pinching movement and cause rotation of the member 7 in the direction of rotation of the axle or shaft 1. When turning a corner, when applied to a vehicle, the outer vehicle wheel will automatically disengage from the idle disks 10 and 15, and rotate independently of the driving member whenever the speed of the outer vehicle wheel is sufficiently greater than the driving member to discontinue the power transmission of the respective draw-connectors 12 when the disks 10 and 15 are thrust out of contact with the driven disk 7. Whenever the rates of speed of the driving and driven members are in favor of the driving member, power transmission adherence of the disk 10 and 15 with disk 7 will again be established.

Having thus fully described my invention, what I claim as new, and desire to secure by Letters-Patent, is

1. In a power transmission mechanism, a driving member and a driven member, an idle disk positioned for engagement with one face of the driven member, a plurality of draw-connectors each in operative engagement at one end with the idle disk and at the other with the driving member, to actuate the driven member in either direction and to permit the driven member to independently revolve faster than the driving member in either direction.

2. In a power transmission mechanism, the combination with a driving member of an idle disk upon each side of the driven member, each disk positioned for engagement with one surface of the driven member, a plurality of means each in operative engagement at one end with the driving member and at the other end connected and disposed for movement of the idle disks, to pinch the driven member and rotate therewith in either direction and to permit the driven member to disengage and independently revolve faster than the driving member in either direction.

3. In a power transmission mechanism, the combination with a driving member and a driven member, of a plurality of idle disks positioned with the driven member therebetween, anti-friction members bearing against the driven member, a plurality of draw connectors each in operative engagement at one end with the driving member, and at the other end connected and disposed for movement of the idle disks to pinch the driven member and rotate therewith in either direction and permit the driven member to disengage and independently revolve faster than the driving member in either direction.

4. In a power transmission mechanism, the combination of independent shafts, a driving member rotatable independently of the shafts, a driven member fixed to each shaft, an idle disk positioned for engagement with the driven member on each shaft, and a plurality of draw-connectors each in operative engagement at one end with the driving member and at the other end connected and disposed for movement of the respective idle disks to pinch the driven members therebetween and rotate therewith.

5. In a power transmission mechanism, the combination of independent shafts, a driving member rotatable independently of the shafts, a driven member fixed to each shaft, a plurality of pairs of idle disks, each pair of disks having a driven member therebetween, and a plurality of draw-connectors each in operative engagement at one end with the driving member, and at the other end connected and disposed for movement of the respective idle disks to pinch the respective driven members therebetween and rotate therewith.

In testimony whereof, I affix my signature in the presence of two witnesses.

CLARENCE W. TAYLOR. [L. S.]

Witnesses:
SCOTT M. HOGAN,
M. KING.

---

Copies of this patent may be obtained for five cents each, by addressing the "Commissioner of Patents, Washington, D. C."